United States Patent [19]

Yamamoto et al.

[11] 4,381,912
[45] May 3, 1983

[54] EXTRUSION DIE FOR FORMING A HONEYCOMB STRUCTURE

[75] Inventors: Shinichi Yamamoto, Takahama; Mitsuru Asano, Okazaki; Zituo Suzuki; Toshihiko Ito, both of Aichi, all of Japan

[73] Assignee: Nippon Soken, Inc., Nishio, Japan

[21] Appl. No.: 282,092

[22] Filed: Jul. 10, 1981

[30] Foreign Application Priority Data

Mar. 25, 1981 [JP] Japan .................................. 56-43341

[51] Int. Cl.³ .................................................. B29F 3/04
[52] U.S. Cl. ................................ 425/461; 264/177 R; 425/380; 425/465; 425/467
[58] Field of Search .............. 425/467, 461, 462, 464, 425/465, 466, 197–199, 380; 264/177 R, 209.1, 209.8

[56] References Cited

U.S. PATENT DOCUMENTS

| | | | |
|---|---|---|---|
| 3,983,283 | 9/1976 | Bagley | 425/461 |
| 4,075,270 | 2/1980 | Cunningham | 264/40.5 |
| 4,168,944 | 9/1979 | Morikawa et al. | 425/464 |
| 4,178,145 | 12/1979 | Hamamoto et al. | 425/199 |
| 4,278,412 | 7/1981 | Ozaki et al. | 425/464 |
| 4,298,328 | 11/1981 | Frost | 425/467 |
| 4,349,329 | 9/1982 | Naito et al. | 425/380 |

FOREIGN PATENT DOCUMENTS 1579016 3/1970 Fed. Rep. of Germany ...... 425/197

Primary Examiner—Jeffery R. Thurlow
Attorney, Agent, or Firm—Cushman, Darby & Cushman

[57] ABSTRACT

An extrusion die for forming a honeycomb structure comprises a die body provided with a plurality of disconnected feed passageways which are formed from the inlet face thereof, interconnected grid-shaped extrusion slots which are formed from the outlet face thereof so as to be communicated with said feed passageways, and an annular stepped portion formed in the outer peripheral portion of the outlet face thereof, and an annular die mask which covers the stepped portion of the die body below the outlet face of the central unstepped portion of the die body. And between the die mask and a dropped portion formed between the stepped portion and the unstepped portion of the die body, an annular opening portion which opens in the extruding direction is formed.

9 Claims, 11 Drawing Figures

F I G. 10
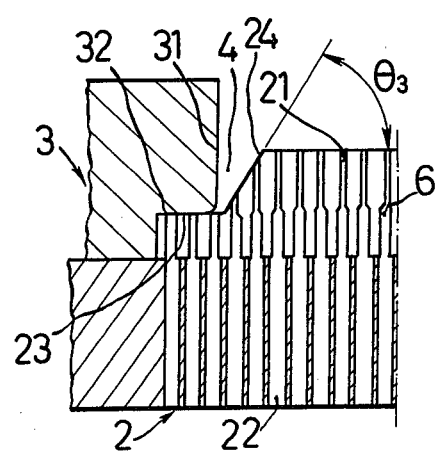
F I G. 11
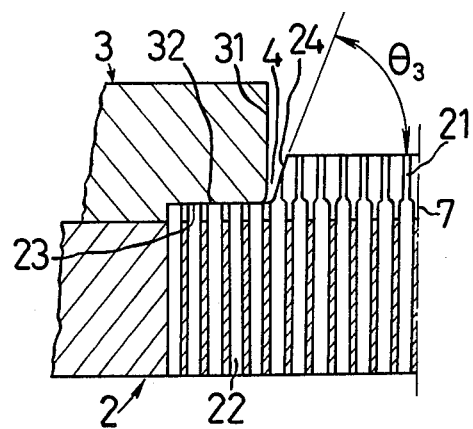

EXTRUSION DIE FOR FORMING A HONEYCOMB STRUCTURE

BACKGROUND OF THE INVENTION

The present invention relates to an extrusion die to be used for extruding a honeycomb structure.

FIG. 1 shows a catalyst support for purifying exhaust gas, which is a typical example of the honeycomb structure.

A catalyst support 1 is provided with a large number of open passages 12 which are surrounded by thin partition wall 11. Since the honeycomb structure having the above described construction is made of fragile material, mechanical strength thereof is low.

Therefore, the honeycomb structured catalyst support which is mounted in a vehicle, is in danger of being damaged due to thermal shock caused by rapid changes in exhaust gas temeprature, and vibrations of the running vehicle.

And the honeycomb structured catalyst support is also in danger of being damaged during the operation for mounting it in the vehicle.

In order to improve the mechanical strength, an outer peripheral wall 13 thicker than the partition wall 11 is formed in the outer peripheral portion of the honeycomb structure so as to be one body with the partition wall 11.

The conventional extrusion die for extruding the honeycomb structure provided with such an outer peripheral wall 13, has a construction shown in FIG. 2 or FIG. 3.

The extrusion die shown in FIG. 2 is provided with a die body 2 and a die mask 3. The die body 2 has a well known construction. In the outlet side of the extrusion die, interconnected grid-shaped extrusion slots 21 having the cross sectional shape corresponding to the partition wall 11, are formed.

In the inlet side of the extrusion die, a plurality of disconnected feed passageways 22 are formed. Each one end of the feed passageways 22 is interconnected with each one end of the extrusion slots within the die body 2.

In the outer peripheral portion of the end surface of the die body 2 on the outlet side thereof, the die mask 3 is disposed. Along the inner surface 31 of the die mask 3, the outer peripheral surface of the honeycomb structure which was extruded out of the die body 2 is formed. The diameter of the inner surface 31 of the die mask 3 is made smaller than that of the end surface of the die body 2, wherein the extrusion slots are formed. Between the end surface of the die body 2 and that of the die mask 3, an opening portion 4 is annularly formed.

The extrudable material is pressed into the extrusion slots 21 from the feed passageways 22 and is extruded out of the extrusion slots 21.

In this case, the material extruded into the annular opening portion 4 moves toward the central portion of the extrusion die to crush the open passages formed in the outer peripheral portion of the honeycomb structure which has been extruded out of the die body 2. Consequently, a honeycomb structure provided with a thick peripheral wall is obtained.

However, the material extruded into the opening portion 4 applies pressure into the outer periphery of the honeycomb structure which has been already extruded out of the die body 2 so that distortion is generated in the partition wall of the outer peripheral portion of the obtained honeycomb structure. Due to this distortion, strength of the honeycomb structure becomes nonuniform. Desirable mechanical strength cannot be obtained throughout the obtained honeycomb structure.

In the extrusion die shown in FIG. 3, the outer periphery of the end surface of the die body 2 on the outlet side thereof, is formed into a tapered surface inclined at an angle of $\Theta_1$, and the end surface of the die mask 3, which is opposed to the tapered surface of the die body 2, is also formed into a tapered surface inclined at an angle of $\Theta_2$ to the tapered surface of the die body 2. An annular opening portion 4 is formed between the above two tapered surfaces.

In this extrusion die shown in FIG. 3, since the moving direction of the material extruded into the opening portion 4 approaches to that of the material which is extruded out of the extrusion slots positioned in the central portion of the die body 2 straightly, the pressure applied to the outer peripheral portion of the extruded honeycomb structure is slightly weakened so that the generation of the distortion is also decreased.

However, in the extrusion die shown in FIG. 3, the generation of the distortion cannot be prevented completely since pressure is applied to the outer periphery of the honeycomb structure after being extruded.

In particular, when a honeycomb structure having a partition wall with a thickness of about 0.3 mm or less is formed by the conventional extrusion die, distortion is frequently generated due to the pressure applied by the material extruded into the opening portion 4. As a result, there may be a case when the honeycomb structure cannot be extruded out of the conventional die.

Accordingly, one object of the present invention is to provide an extrusion die for extruding a honeycomb structure provided with a thick peripheral wall and having an excellent mechanical strength.

Another object of the present invention is to provide an extrusion die by which a thick peripheral wall can be integrally formed in the outer peripheral portion of a honeycomb structure without generating any distortion therein.

Still another object of the present invention is to provide an extrusion die suitable for extruding a catalyst support for purifying exhaust gas, provided with a large number of narrow open passages which are divided by a thin partition wall and a thick peripheral wall which is integrally formed on the outer periphery thereof, and having excellent strength.

DESCRIPTION OF THE DRAWINGS

Other objects and advantages of the invention will become apparent from the following description of embodiments with reference to the accompanying drawings wherein:

FIG. 4 to FIG. 11 show extrusion dies of several embodiments of the present invention;

FIG. 4 is a partially sectional view of the extrusion die of a first embodiment;

FIG. 5 is an end view taken in the direction of the arrow A of FIG. 4;

FIG. 6 is a partially sectional view of a second embodiment;

FIG. 7 is a partially sectional view of a third embodiment;

FIG. 8 is a partially sectional view of a fourth embodiment;

FIG. 9 is a partially sectional view of a fifth embodiment;

FIG. 10 is a partially sectional view of a sixth embodiment; and

FIG. 11 is a partially sectional view of a seventh embodiment.

SUMMARY OF THE INVENTION

In the extrusion die of the present invention, a stepped portion is annularly formed in the outer peripheral portion of one end surface of a die body, wherein extrusion slots are formed.

A die mask is provided so that an annular end surface thereof is opposed to the stepped portion, and the end surface of the die mask is positioned below the unstepped end surface of the die body.

The lower end portion of an inner surface of the die mask is opposed to a dropped portion of the die body, which is formed between the unstepped end surface and the stepped end surface thereof. An annular opening portion is formed between the lower end portion of the inner surface of the die mask and the dropped portion of the die body.

According to the present invention, the extrudable material which is supplied into the extrusion slots of the outer peripheral portion under pressure is stopped from straightly moving by the end surface of the die mask and laterally moves toward the center of the die body. One portion of the material which laterally moves toward the center of the die body from the outer peripheral portion is extruded out of the extrusion slots positioned in the central portion of the die body after being joined into the material moving therethrough straightly.

The other portion of the above material is charged in the opening portion formed between the inner saurface of the die mask and the dropped portion of the die body, and extruded along the inner surface of the die mask together with the material which is extruded out of the extrusion slots positioned under the opening portion to form an outer peripheral wall of the obtained honeycomb structure.

According to the present invention, the end surface of the die mask, which is opposed to the stepped portion of the die body, is positioned below the end surface of the unstepped central portion of the die body. The opening portion is also positioned below the end surface of the unstepped central portion of the die body.

Therefore, the material which laterally moves from the extrusion slots of the outer peripheral portion of the die body is joined into the material which straightly moves along the extrusion slots of the central portion of the die body before being extruded out of the die body. Consequently, no distortion is produced between the outer peripheral wall and the remainder of the obtained honeycomb structure.

The material which is charged in the opening portion is extruded out of the die together with the material which is extruded out of the extrusion slots positioned under the opening portion to prevent any shortage of material in a thick outer wall formed on the outer periphery of the obtained honeycomb structure.

DETAILED DESCRIPTION OF THE INVENTION

Hereinafter, the present invention will be explained in detail in accordance with several embodiments with reference to the accompanying drawings.

Figure 1:
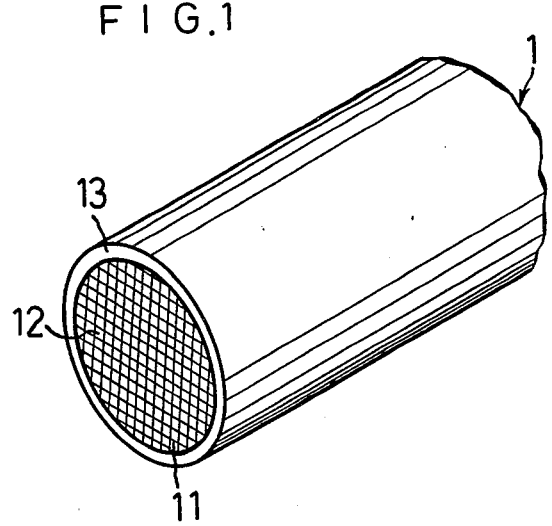
FIG. 1 is a view showing one example of the honeycomb structure which is extruded by the extrusion die of the present invention.
Figure 2:
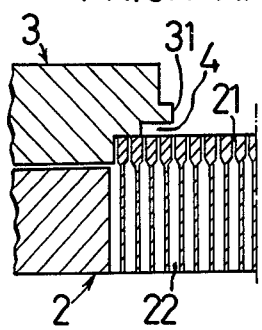
FIG. 2 and FIG. 3 are partially sectional views of the conventional extrusion dies.
Figure 3:
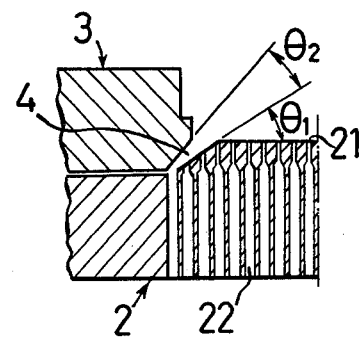
Figure 4:
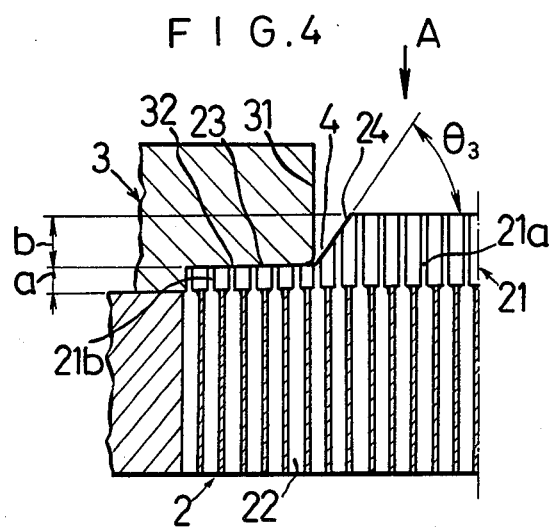
Figure 5:
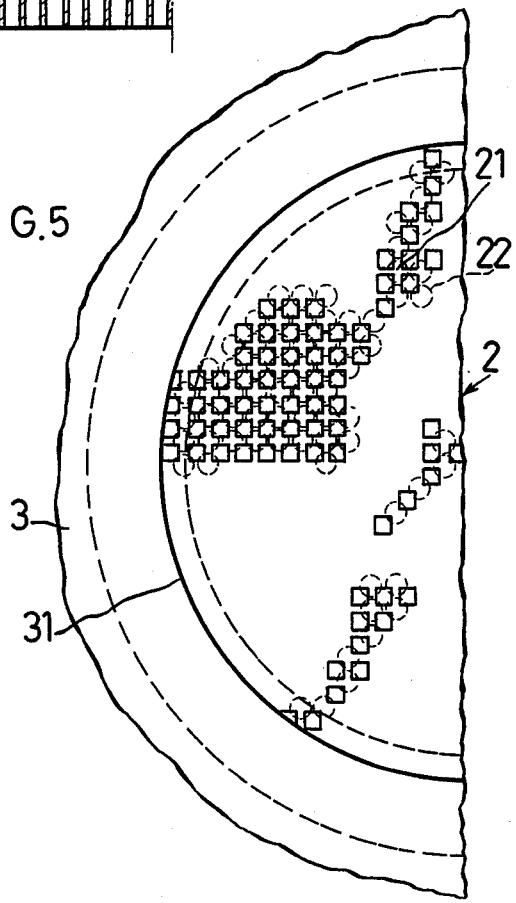

In a first embodiment shown in FIG. 4 and FIG. 5, the reference number 2 designates a die body and 3 designates a die mask.

From one end surface of the die body 2 on the inlet side thereof, a plurality of disconnected feed passageways 22 are formed to a predetermined depth. From the other end surface of the die body 2 on the outlet side thereof, interconnected grid-shaped extrusion slots 21 are formed so as to be communicated with the feed passageways 22 within the die body 2.

In the outer peripheral portion of the other end surface of the die body 2, a stepped portion or face 23 is formed.

The depth of the extrusion slots 21b formed in the stepped portion 23 is made smaller than that of the extrusion slots 21a formed in the unstepped portion of the die body 2. A dropped portion or inclined faced 24 between the stepped portion 23 and the central unstepped portion or face is tapered at an angle of $\Theta_3$ to the end surface or face of the unstepped portion of the die body 2.

The die mask 2 is provided with an inner surface 31 having a circular or elliptical cross section. One end surface of the die mask 2 is closely contacted with the stepped portion 23 so as to close extrusion slots 21b. The dropped tapered portion 24 of the die body 2 is radially opposed to the lower end portion of the inner surface 31 of the die mask 3. Between the dropped tapered portion 24 and the die mask 3, an opening portion 4 of which width is increased in the extruding direction, is annularly formed.

In the extrusion die of the first embodiment having the above described construction, the material such as ceramic powder batch slurry, is supplied from the feed passageways 22 into the extrusion slots 21 under pressure. Then, the material is formed into a unitary grid shaped body by the extrusion slots.

The extrudable material supplied into the extrusion slots 21b which are formed in the stepped portion 23 of the die body 2, laterally flows toward the central portion of the die body 2 since the outlet port of each extrusion slot is closed by the end surface 32 of the die mask 3. One portion of the above described material is directly supplied into the extrusion slots 21a formed in the central portion of the die body 2, under pressure and extruded out of the extrusion slots 21a together with the material which is straightly supplied into the extrusion slots 21a.

The other portion of the material which is supplied into the extrusion slots 21b formed in the stepped portion 23, is extruded into the opening portion 4, and partially flows into the extrusion slots 21a surrounded by the opening portion 4 to be extruded therefrom together with the material moving within the extrusion slots straightly. The material remaining in the opening portion 4 without flowing into the extrusion slots 21a, is extruded along the inner surface 31 of the die mask 3 together with the material moving straightly from the extrusion slots formed in the dropped portion 24 to form an outer peripheral wall of the honeycomb structure.

As described above, in the extrusion die of the first embodiment, the material supplied into the extrusion slots 21b formed in the stepped portion 23 laterally moves toward the center of the die body 2 and then extruded out of the extrusion slots formed in the dropped portion 24 and the unstepped central portion 21. Therefore, no pressure is applied to the outer periphery of the resultant honeycomb structure, and consequently no distortion is generated in the partition wall of the open passages of the obtained honeycomb structure.

Furthermore, the material charged within the opening portion 4 is extruded together with the material supplied into the extrusion slots formed in the dropped portion 24 along the inner surface 31 of the die mask 3.

Therefore, on the outer periphery of the obtained honeycomb structure, a sufficiently thick and dense peripheral wall can be formed without any shortage of material.

There has been produced a honeycomb structure by extruding a slurry containing ceramic powder by means of the extrusion die according to the first embodiment of the present invention. The inner peripheral surface of the die mask 3 has an elliptical cross section 170 mm in long diameter and 80 mm in short diameter, the extrusion slots 21 has a width of 0.15 mm, a depth of 2.0 mm and a pitch of 1.0 mm, the dropped portion 24 is tapered at an angle of 70° and the extrusion slots 21a and 21b have a depth of 0.6 mm and 1.4 mm respectively.

As a result, the obtained ceramic honeycomb structure is provided with a peripheral wall of which thickness is 0.6 mm and no distortion can be observed in the partition wall of the open passages of the obtained honeycomb structure.

According to the result of the inventors' experiments, the preferable tapered angle $\Theta_3$ of the dropped portion 24 is about 60° or more. As the angle $\Theta_3$ is increased, the wall thickness of the obtained honeycomb structure becomes small.

The tapered angle $\Theta_3$ of the dropped portion 24 can be freely selected from the range of not less than about 60° and below 90°.

It is preferable that the ratio of the stepped depth b to the depth a of the extrusion slots 21b formed in the stepped portion 23 is not less than 1.

Figure 6:
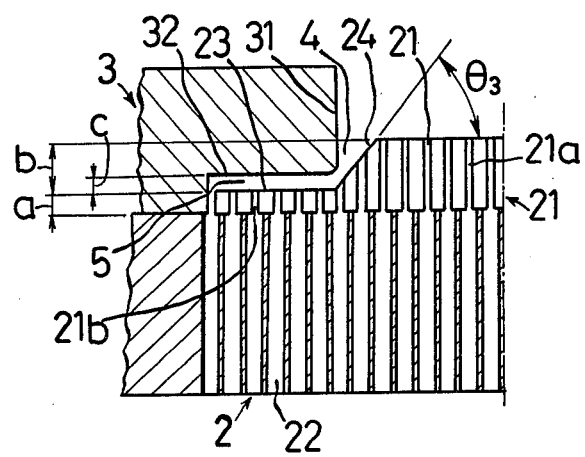

FIG. 6 shows an extrusion die of a second embodiment of the present invention.

In the extrusion die of the second embodiment, a gap portion 5 having a width of c is provided between the stepped portion 23 of the die body 2 and the opposed end surface 32 of the die mask 3. And the width c of the gap portion 5 is made smaller than the stepped depth b in FIG. 6.

Otherwise, the construction of the extrusion die of the second embodiment is substantially the same as that of the first embodiment.

By providing such a gap portion 5 as described above, the density of the material which is supplied under pressure into the extrusion slots 21a and the opening portion 4 from the extrusion slots 21b and the gap portion 5 becomes smaller than that of the first embodiment and approaches that of the material which straightly moves through the extrusion slots 21a formed in the central portion of the die body 2.

Therefore, the density of the partition wall and that of the outer peripheral wall of the obtained honeycomb structure become uniform and the strength against thermal shock of the obtained honeycomb structure is increased.

Figure 7:
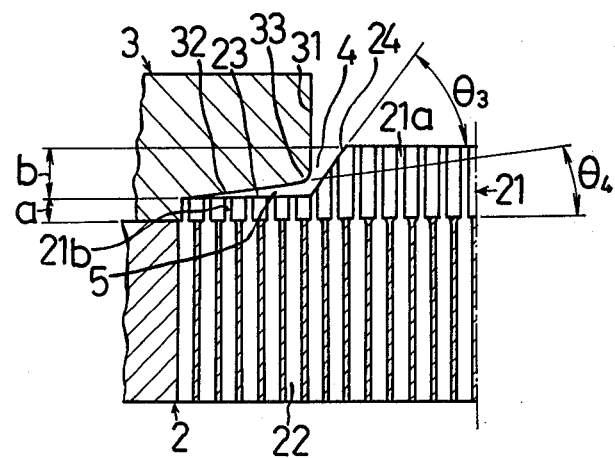

FIG. 7 shows an extrusion die of a third embodiment of the present invention.

In the extrusion die of the third embodiment, the end surface 32 of the die mask 3, which is opposed to the stepped portion 23 of the die body 2 is formed into a tapered surface and a gap portion 5 of which width is increased toward the central portion of the die, is provided between the tapered end surface 32 and the stepped portion 23.

In this case, the tapered angle of the end surface 32 of the die mask 3 is made smaller than that of the dropped portion 4. The lower end of the inner surface 31 of the die mask 3 is positioned below the end surface of the central portion of the die body 2 and the opening portion 4 is formed between the inner peripheral surface 31 and the dropped portion 24 of the die body 2.

Otherwise, the construction of the extrusion die of the third embodiment is substantially equal to that of the first and second embodiments.

By forming the end surface 32 of the die mask 3 into a tapered surface, the fluidity of the material which is extruded by the extrusion slots 21b formed in the stepped portion 23 is improved. Consequently, the material smoothly flows into the opening portion 4 formed between the inner peripheral surface 31 and the tapered surface 24 of the die body 2 from the gap portion 5.

Figure 8:
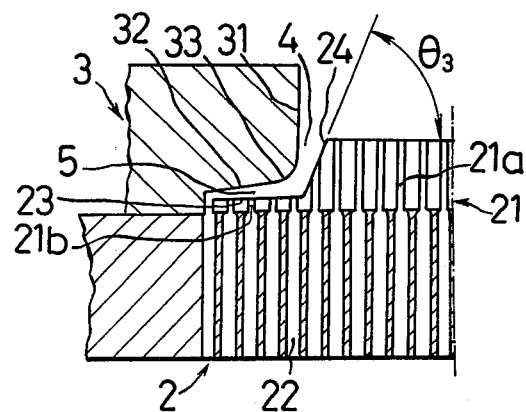

FIG. 8 shows an extrusion die of a fourth embodiment of the present invention.

In the extrusion die of the fourth embodiment, the lower end of the inner surface 31 is formed into a curved corner surface 33 which is continued into the tapered end surface 32 of the die mask 3.

Otherwise, the construction of the fourth embodiment is substantially equal to that of the third embodiment.

By forming the lower end of the inner surface 31 of the die mask 3 into a curved corner surface 33, the fluidity of the material which flows from the gap portion 5 into the opening portion 4 can be increased further.

Figure 9:
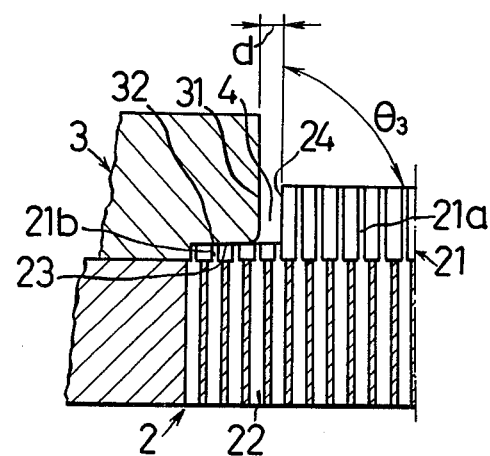

FIG. 9 shows an extrusion die of a fifth embodiment of the present invention.

The angle $\Theta_3$ of the dropped portion 24 to the end surface of the central portion of the die body 2 is made into 90°.

Between the dropped portion 24 and the opposed inner surface 31 of the die mask 3, an opening portion of which width (d) is uniform, is formed. The lower end of the inner surface 31 of the die mask 3 is formed into a curved corner surface continuing to the end surface 32 thereof.

Otherwise, the construction of the fifth embodiment is substantially equal to that of the first embodiment.

By making the dropped portion 24 not tapered but parallel with the inner peripheral surface 31 of the die mask 3, and forming an opening portion having a uniform width between the dropped portion 24 and the opposed inner peripheral surface 31, the same operation and effect as those of the first embodiment can be obtained.

Embodiments shown in FIG. 10 and FIG. 11 are different from the preceding embodiments in the construction of the die body 2.

In the sixth embodiment shown in FIG. 10, the die body 2 is provided with a plurality of interconnected grid-shaped pooling slots 6 between the feed passageways 22 and the extrusion slots 21 so as to be communicated therewith.

The width of the pooling slots 6 is slightly larger than that of the extrusion slots 21. The material which is supplied into each feed passageway 22 under pressure is temporarily pooled in the pooling slots 6 and then is supplied into the extrusion slots 21. Therefore, by providing the pooling slots 6 between the feed passageways 22 and the extrusion slots 21, the material is uniformly distributed in each extrusion slot 21.

The stepped portion 23 of the die body 2 is formed so that the each end of the pooling slots positioned in the peripheral portion of the die body 2 is exposed therefrom. The end surface 32 of the die mask 3 is contacted with this stepped portion 23.

According to the sixth embodiment, the material which is supplied into the pooling slots 6 positioned in the peripheral portion of the die body 2, flows into the pooling slots 6 positioned in the central portion thereof, and then moves through the extrusion slots 21 together with the material supplied into the pooling slots positioned in the central portion of the die body 2.

Otherwise, the construction, operation and effect of the sixth embodiment are substantially equal to those of the first embodiment.

In the seventh embodiment shown in FIG. 11, the die body 2 is provided with the feed passageways 22 and the extrusion slots 21 which are overlapped with each other in their connecting portion. The upper end of each feed passageway projects within the extrusion slots.

According to the seventh embodiment, the material can be effectively distributed with uniformity into each extrusion slot 21 when the material is supplied into the extrusion slots 21 from the feed passageway 22 under pressure.

In the extrusion die of the seventh embodiment, the stepped portion 23 is formed in the overlapped connecting portion 7 of the extrusion slots 21 and the feed passageways 22.

In the seventh embodiment, the material which is supplied into the overlapped connecting portion 7 of the outer peripheral portion of the die body 2 flows into that of the central portion thereof and moves through the extrusion slots positioned in the central portion together with the material which is supplied into the extrusion slots of the central portion of the die body 2.

Otherwise, the construction, operation and effect of the seventh embodiment are substantially equal to those of the first embodiment.

As described above, according to the extrusion die of the present invention, a honeycomb structure which is provided with a plurality of narrow open passages surrounded by a thin partition wall, and a thick peripheral wall integrally formed in the outer periphery thereof can be extruded without generating any distortion and deformation in the partition wall thereof.

The extrusion die of the present invention can be also applied to the extrusion of the honeycomb structure made of such an extrudable material as clay and rubber other than ceramic.

In particular, the extrusion die of the present invention can be effectively employed to integrally form an outer peripheral wall in the honeycomb structure made of such a fragile material as ceramic.

Having now fully described the invention, it will be apparent to one of ordinary skill in the art that many changes and modifications can be made thereto without departing from the spirit or scope of the invention as set forth herein.

What is claimed is:

1. An extrusion die for forming a honeycomb structure, comprising:
    a die body provided with a plurality of disconnected feed passageways having a predetermined depth, which are formed on an inlet side thereof, and interconnected grid-shaped extrusion slots which are formed on an outlet side thereof so as to be communicated with said feed passageways and open to an outlet surface of said die body;
    said outlet surface having a central face, an annular stepped face which is formed in the outer peripheral portion of said die body on the upper stream side of said central face so as to cut said extrusion slots in parallel with said central face, and a dropped annular face which is formed between said central face and said stepped face; and
    an annular die mask which covers said stepped face of said die body in a position on said upper stream side of said central face of said die body;
    said die mask being provided with an annular inner wall extending perpendicularly to said central face;
    said inner wall being opposed to said dropped face through an annular opening portion.

2. An extrusion die according to claim 1, wherein:
    said dropped face is formed into a tapered surface; and
    the width of said annular opening portion is gradually increased in the extrudable material extruding direction.

3. An extrusion die according to claim 2, wherein:
    said dropped face is inclined to said central face of said die body at an angle of not less than about 60° and below 90°.

4. An extrusion die according to claim 1, wherein:
    an end surface of said die mask is closely contacted with said stepped face of said die body.

5. An extrusion die according to claim 1, wherein:
    an end surface of said die mask is opposed to said stepped face through a gap portion.

6. An extrusion die according to claim 5, wherein:
    said end surface of said die mask is formed into a tapered surface so that the width of said gap portion is increased in the direction of said central portion of said die body.

7. An extrusion die according to claim 1, wherein:
    a lower end of said inner wall of said die mask is formed into a curved corner portion so as to continue to an end surface of said die mask.

8. An extrusion die according to claim 1, wherein:
    said extrusion slots are provided with pooling portions in the connecting portion with said feed passageways;
    the width of said pooling portions being slightly larger than said extrusion slots; and
    said stepped face is formed in said pooling portions.

9. An extrusion die according to claim 1, wherein:
    said feed passageways projects within the portion wherein said extrusion slots are formed, so as to be interconnected with said extrusion slots; and
    said stepped face is formed so that said feed passageways which are interconnected with said extrusion slots are exposed therefrom.

* * * * *